March 27, 1962 R. S. MOFFETT 3,027,326
INSULATION MATERIAL
Filed May 20, 1959
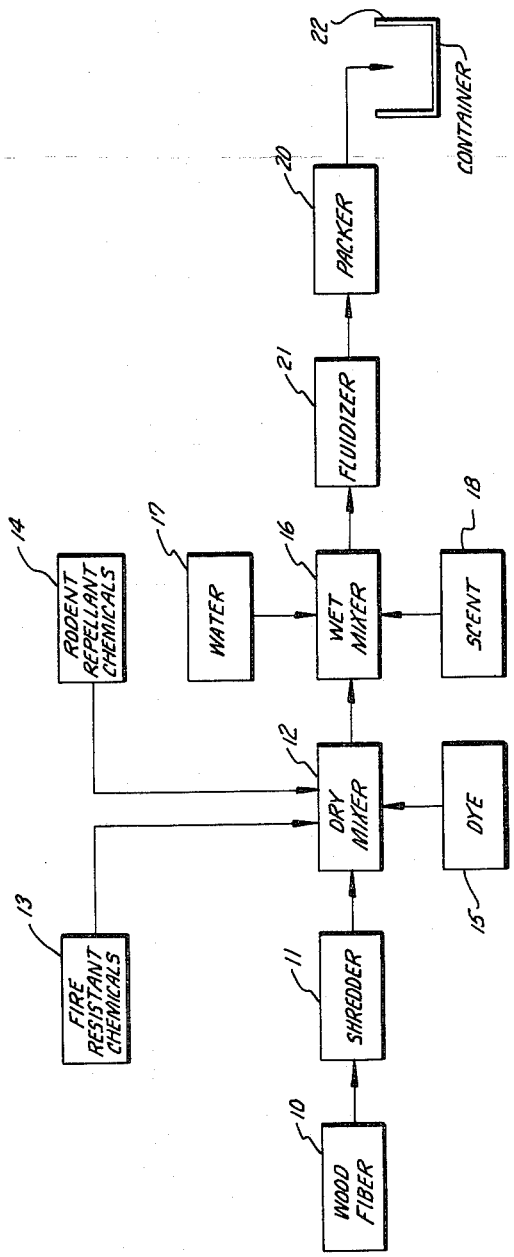
INVENTOR.
ROBERT S. MOFFETT
BY
ATTORNEYS.

3,027,326
INSULATION MATERIAL
Robert S. Moffett, Woodland Hills, Calif., assignor to Insul-Seal Products, Inc., Pasadena, Calif., a corporation of California
Filed May 20, 1959, Ser. No. 814,529
3 Claims. (Cl. 252—62)

This invention relates to an improved insulation material of the shredded wood fiber type.

Insulation materials consisting of asbestos or glass fibers are well known. Such insulating materials have a generally satisfactory resistance to burning and a comparatively low heat transfer coefficient. However, such insulating materials do melt or char to an extent sufficient to transfer a flame through the material. Furthermore, a significant amount of heat is transmitted through such insulating materials.

According to the present invention, an improved resistance to charring and a lower coefficient of heat transfer in an insulation material is exhibited by the end product of a process consisting of treating shredded wood fiber material with ammonium sulfate, boric acid, potassium alum, a dye from the family of dyes consisting of the diamino derivatives of triphenyl methane, and water. In addition, a liquid aromatic agent is utilized to give the end product insulating material an acceptable aroma. These constituents are then chemically combined. After chemical processing, the insulation material is dried by being fluidized by air and is then packed into appropriate containers.

A moisture absorption test of the material shows the following typical characteristics:

| Time of Exposure, Hours | Percent Loss in Weight, 50% Relative Humidity | Percent Gain in Weight, 75% Relative Humidity | Percent Gain in Weight, 100% Relative Humidity |
|---|---|---|---|
| 50 | 1.15 | 1.81 | 5.90 |
| 100 | 1.55 | 2.49 | 10.80 |
| 200 | 1.78 | 3.37 | 32.5 |

The fire-resistant quality of the insulation material is illustrated by the following test. After being maintained at a constant temperature of 135° Fahrenheit for thirty-nine days, the insulation material is subjected directly to a flame from a Bunsen burner for a period of fifteen minutes. After removal of the flame, smoldering of the insulation material is visible for no longer than two and one-half minutes. The maximum penetration of charring into the insulation material is five inches.

The dielectric strength of the insulation material is illustrated by the fact that no appreciable difference exists between the dielectric strength of air and the dielectric strength of the end product insulation material at relative humidities less than 50%. At relative humidities in the range of 75 to 100%, the dielectric strength of the insulation material is approximately two-thirds that of free air.

The drawing is a block diagram illustrating the process by which the insulating material is produced.

Referring to the drawing, wood fiber from a source of wood fiber 10 is fed to a wood fiber shredder 11. The primary constituent of the insulating material according to the invention is shredded wood fiber. Used newsprint furnishes a satisfactory source of such wood fiber. The newsprint is finely shredded so as to have a flour or fluff-like consistency by the shredder 11.

The fluff-like shredded wood fiber output of the shredder 11 is applied to a dry mixer 12. Chemicals from a source of fire-resistant chemicals 13, rodent and roach repellent from a source of rodent and roach repellent 14, and dye from a dye source 15 are also applied to the dry mixer 12.

Boric acid, $H_3BO_3$, and ammonium sulfate, $(NH_4)_2SO_4$, are combined with the wood fiber fluff to give initial fire-resistant properties to the fluff. Such fire-resistant properties are evidenced by a greenish glow which surrounds portions of the fluff as the fluff slowly chars in response to the application of a direct flame. The fire-retardant quality of the fluff so treated is considerably superior to this property in conventional asbestos or glass fiber insulating materials.

The treatment of the wood fiber fluff formed from used newsprint with boric acid and ammonium sulfate does not remove ink and other impurities from the fluff which existed in the newsprint. These impurities have been found to be attractive to rodents and roaches of various types. It has been found that the addition of potassium alum, $Al_2(SO_4)_3K_2SO_4 \cdot 24H_2O$, to the fluff renders the end product unattractive to such rodents and roaches.

The use of used newsprint, even when treated to the extent previously described, results in a gray material which lacks any attractiveness in its color. A dye is therefore added to the material in order to give the end product insulating material a satisfactory color appearance for commercial use. A dye from the family of dyes consisting of diamino derivatives of triphenyl methane also adds fire-retardant qualities to the insulating material. An example of such a dye is Brilliant Green, diethylamino triphenyl methane, whose chemical representation is

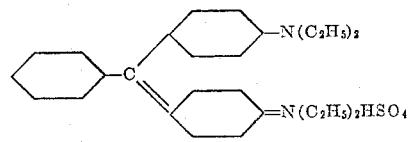

The resulting dry mix output is fed to a wet mixer 16. Water from a water source 17 and liquid aromatic from a source of liquid aromatics 18 are also applied to the wet mixer 16.

An example of such a liquid aromatic is "Alamask CPM," which has the following composition:

| | Percent |
|---|---|
| Organic aldehydes | 3.5 |
| Acetates as Iso Dorynl | 9.9 |
| Organic ketones | 5.7 |
| Essential oil terpenes | 60.3 |
| Organic esters as phthalate | 20.6 |

Alamask CPM has the additional properties when combined with the other constituents in the proportions given herein of adding to the fire-resistance of the material and of adding to the roach repellency of the material, thereby increasing the over-all efficacy of insulating material.

Chemical reactions between the various constituents occur in the wet mixer 18. The output of the wet mixer consists of a damp insulating material. This damp insulating material is simultaneously dried and transported to a packer 20 by means of a solids fluidizer 21. The solids fluidizer 21 preferably utilizes air as the fluidizing agent. The dried insulating material is packed into containers 22 by the packer 20.

Although some variation in the proportions of the various constituents may be made without having a decisively adverse effect upon the performance of the insulating material, the preferred embodiment of the insulating material is produced by a process utilizing the previously named constituents in the following proportions by weight:

| | Parts |
|---|---|
| Shredded wood fiber as used newsprint | 68 |
| Ammonium sulfate | 4 |
| Boric acid (powdered 99½% pure) | 6.5 |
| Potassium alum | 4 |
| Brilliant Green dye | 4 |
| Alamask CPM | 2 |
| Water (liquid form) | 8 | thereby giving a total of 96.5 parts. The remaining 3.5 parts required to constitute 100 parts of the finished product consist of water taken in during processing in the form of vapor from the air.

It has been found that the fire-resistant quality of the insulating material is improved by the addition of the dye and the aromatic agent over this quality in similar insulating material not so treated. Thus, there is a chemical co-action between the above ingredients which improves the fire-resistant quality, although the actual chemical mechanism causing this improvement is not completely understood by me at this time.

I claim:

1. The insulation material formed by the mixing of constituents consisting essentially of shredded wood fiber, ammonium sulfate, boric acid, and potassium alum in substantially the following weight ratios to each other:

| | Parts |
|---|---|
| Shredded wood fiber | 68 |
| Ammonium sulfate | 4 |
| Boric acid | 6.5 |
| Potassium alum | 4 |
| Water | 8 | and subsequently fluidizing the resultant material.

2. The insulating material formed by mixing constituents consisting essentially of shredded wood fiber, ammonium sulfate, boric acid, potassium alum, a dye from the family of dyes consisting of diamino derivatives of triphenyl methane, and water in substantially the following weight ratios to each other:

| | Parts |
|---|---|
| Shredded wood fiber | 68 |
| Ammonium sulfate | 4 |
| Boric acid | 6.5 |
| Potassium alum | 4 |
| Dye from the family of dyes consisting of diamino derivatives of triphenyl methane | 4 |
| Water | 8 | and subsequently fluidizing the resultant material.

3. The method of producing insulating material consisting of the steps of mixing together sixty-eight parts by weight of shredded wood fiber in the form of used newsprint, four parts by weight of ammonium sulphate, six and one-half parts by weight of boric acid, four parts by weight of potassium alum, and four parts by weight of Brilliant Green dye, in substantially the given proportions, in a dry mixer so as to produce a dry mix, transferring the dry mix to a wet mixer, wetting the dry mix in the wet mix by the addition of substantially ten parts by weight water, and fluidizing the resulting wet mix by air so as to produce a dry product.

References Cited in the file of this patent

UNITED STATES PATENTS

| 12,594 | Holmes | Mar. 27, 1855 |
| 329,973 | Tanczos | Nov. 10, 1885 |
| 1,911,279 | Hochstetter | May 30, 1933 |
| 2,110,470 | Norton | Mar. 8, 1938 |
| 2,120,431 | Stafford | June 14, 1938 |
| 2,147,793 | Kropp | Feb. 21, 1939 |
| 2,470,641 | Portz | May 17, 1949 |

OTHER REFERENCES

"The Condensed Chemical Dictionary," 5th ed., pp. 31 and 1121 (1956), Reinhold Pub. Corp., N.Y.